United States Patent [19]
Post et al.

[11] 3,868,696
[45] Feb. 25, 1975

[54] ROTATABLE RECORDER SCALE ARRANGEMENT

[75] Inventors: Melvin J. Post; James L. McCarthy, both of Rochester, N.Y.

[73] Assignee: Sybron Corporation, Rochester, N.Y.

[22] Filed: Dec. 3, 1973

[21] Appl. No.: 421,050

[52] U.S. Cl. .................. 346/17, 74/109, 116/134, 346/145
[51] Int. Cl. ........................................... G01d 13/04
[58] Field of Search .............. 346/17, 145; 116/134; 74/109, 29; 40/67, 104 R

[56] References Cited
UNITED STATES PATENTS
3,656,176  4/1972  Staley .............................. 346/145

*Primary Examiner*—Joseph W. Hartary
*Attorney, Agent, or Firm*—Theodore B. Roessel

[57] ABSTRACT

A rotatable scale arrangement for strip chart recorders and the like for providing access to recorder writing elements from the front of the instrument. A mechanism is provided for simultaneously rotating each of a plurality of elongated flat strips, adapted to include scale markings, from a position facing the front of the recorder to a position normal thereto, wherein a substantially wider separation is provided between the strips for removal or insertion of the writing elements.

14 Claims, 9 Drawing Figures

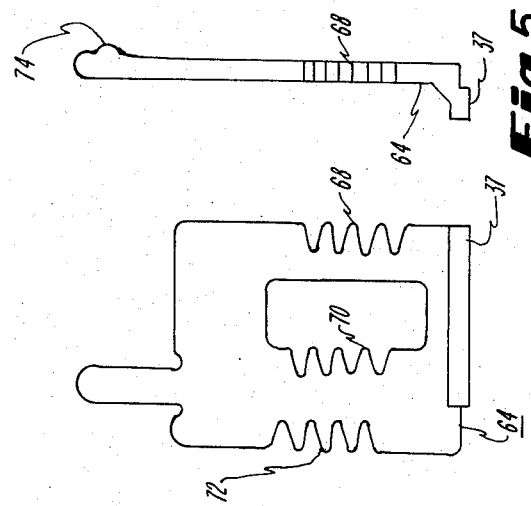
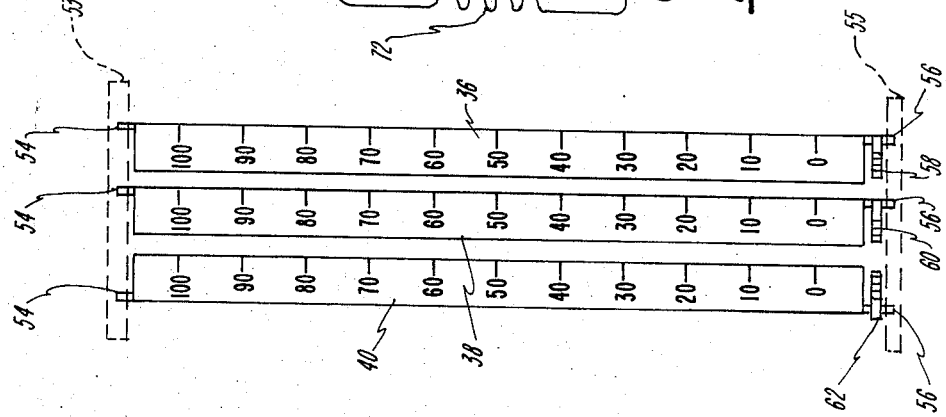
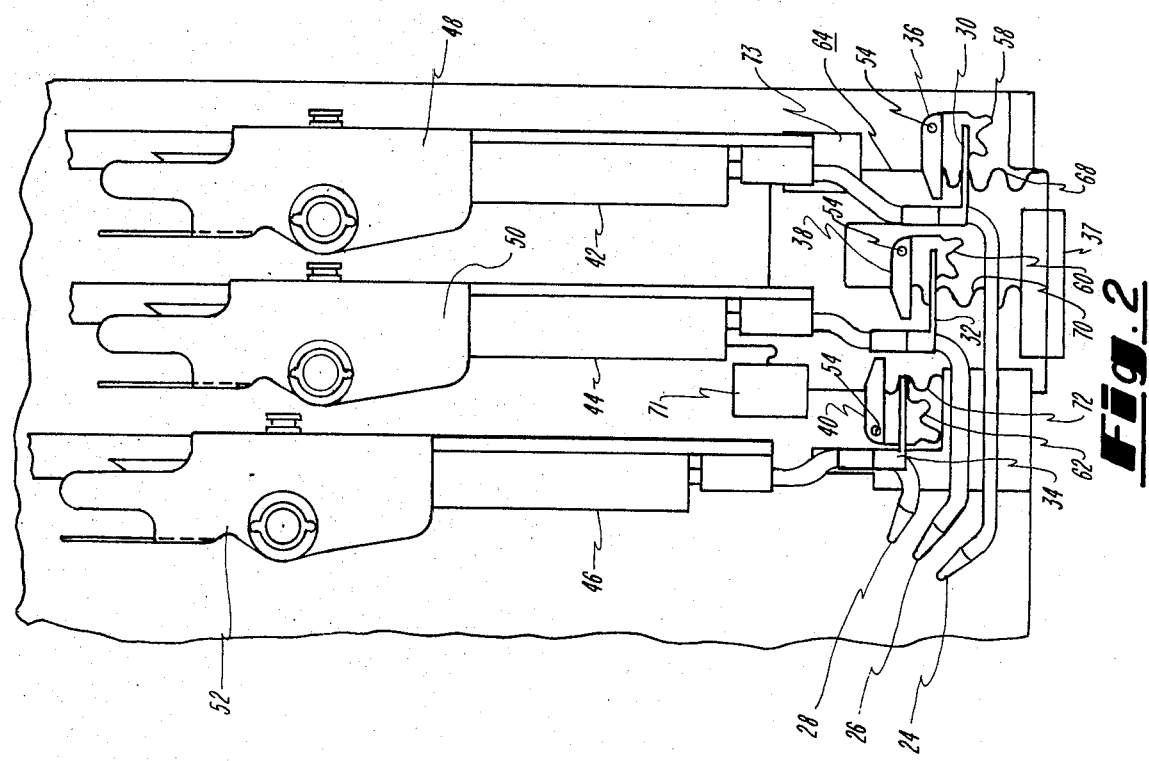

ROTATABLE RECORDER SCALE ARRANGEMENT

BACKGROUND OF THE INVENTION

This invention pertains to scale elements for recording instruments and the like, and more particularly to rotatable linear scale elements for providing access to writing elements from the front a recorder.

At the present time there is a trend for reducing the size of recorder instruments, and the like, wherein a large number of instruments can be mounted side by side so that a plurality of instruments can be simultaneously viewed by an operator. As a result, instruments such as strip chart recorders have been reduced to a narrow rectangular shape with the writing elements and the mechanical control linkages therein included within a more compact space. The writing elements may include pointers that extend over scales so that the instantaneous indication of the position of the writing elements can be observed through the recorder window. The scales for this type of recorder are generally elongated flat strips on which the scale markings for the pointers are included. Because of the compact configuration of the narrow strip chart recorders, it is desirable that the flat strip type scales be located as closely as possible to each other to cover a maximum amount of space so that the scale markings thereon can be as large as possible. When this is done, the spacing between the strip scales is generally only sufficient for the movement of the writing element therebetween. Hence, access to the writing elements, (such as pens) is not available from the front of the instrument. Furthermore, present day recorders include removable ink capsules that have a large supply of ink that last for extended periods of times, thereby reducing the need for the periodic refilling of ink reservoirs. With such an arrangement, the combination of the pen and ink capsule can be replaced and removed as a unit. With the compact recorder units of the prior art, size of the ink capsule is such that the scales generally prohibit the removal of the ink capsule from the front of the instrument. As a result, in order to be able to remove the ink capsules, the recorder is required to pulled from its case to expose the sides of the recording unit, and the ink capsules are removed from the sides. The removal of the ink capsules requires the disconnection of the ink reservoir from its mount as well as a rotary motion to align the pen with the spacing between the scales so that the pen can be urged backward past the scales and then out through the side of the recorder. With this type of arrangement, the pointers attached to the pens are required to be removable, or the size of the pointers is limited to that which can pass through the spaces between the scale elements.

This type of arrangement has proved to be satisfactory for recorders having one or two pens, wherein access can be provided to each ink capsule from opposite sides of the recorder. However, if three, or more pens, are included in the recorder, access is not readily available to the additional central pens and their removal becomes complicated by the need to bypass the various linkages and vertical control elements. It would therefore be highly desirable if some sort of arrangement could be provided wherein the size of the strip scales can be maximized and still allow for the removal of the writing elements from the front of recorders.

It is therefore an object of this invention to provide a new and improved scale arrangement for strip chart recorders, and the like.

It is also an object of this invention to provide a new and improved scale arrangement for strip chart recorders, and the like, that provides for a maximum scale size and still provides for the ready access to the mounting of writing elements from the front of the recorder, and the removal from, and/or insertion in, via the front of the instrument.

It is also an object of this invention to provide a new and improved scale arrangement for strip chart recorders and the like wherein the scales are rotatable to provide access to the writing elements therein from the front of the instrument.

BRIEF DESCRIPTION OF THE INVENTION:

A rotatable scale mechanism for a strip chart recorder, or the like, for indicating the position of writing elements therein, including a plurality of generally rectangular shaped thin strips wherein the width of the strips is substantially less than the length and the thickness of the strips is substantially less than the width. The length and width of the strips define a surface adapted for receiving scale graduations for indicating the position of the writing elements. The plurality of strips are pivotally mounted for rotation along an axis that extends along the length of the strips so that each of the plurality of strips can be rotated from a position wherein the scale surfaces face the front of the instrument to a position wherein the scale surfaces are generally normal to the front of the instrument, thereby increasing the spacing between the strips to provide an access to the mounting of the writing elements within strip chart recorder.

In accordance can the invention, means is provided so that the movement thereof controls the rotational positioning of the scales. The means cann include a gearing mechanism or a friction drive.

The gearing mechanism can, for example, include a separate sector gear for each of the strips and a plurality of rack gears engaging the sector gears wherein a rack gears are all secured to a common handle for the simultaneous movement thereof and rotation of the strips.

The friction drive can, for example, include a separate rubber disc for each strip and a separate straight rubber track engaging each disc to control the rotation thereof.

BRIEF DESCRIPTION OF THE FIGURES

FIG. 2 is a top view of a portion of the recorder of FIG. 1 disclosing the mounting of the pens and their ink capsules relative to the scale elements.

FIG. 3 illustrates the pivotal mounting of the scale elements and the sector gears attached thereto.

FIG. 4 is a plane view of the rack gear mechanism for engaging the sector gears connected to the scale elements for controlling the simultaneous rotation of the scale elements.

FIG. 5 is side view of the rack gear mechanism of FIG. 4.

Figure 1:
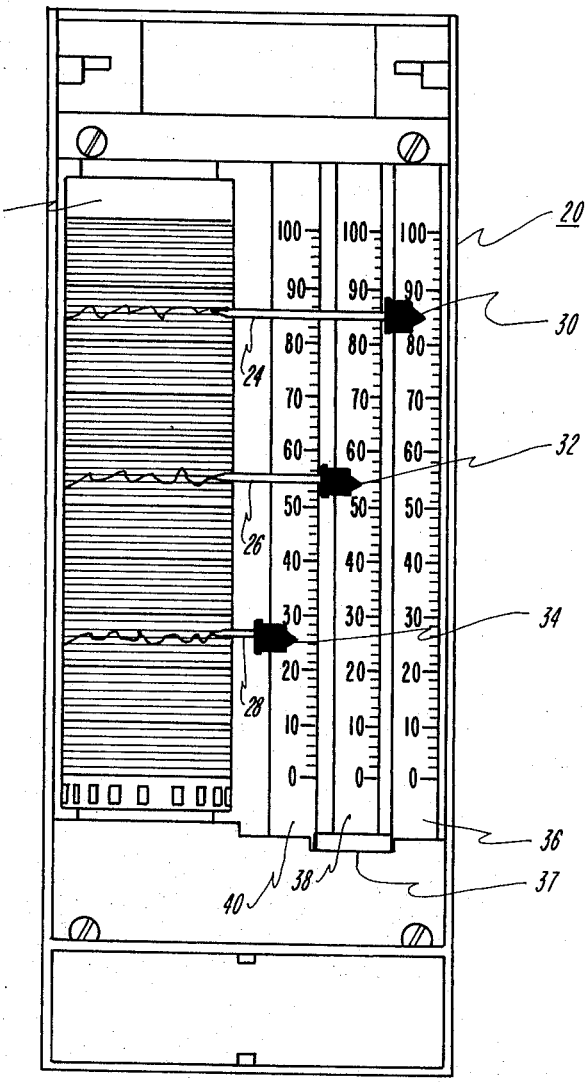
FIG. 1 is a front view of a compact strip chart recorder with its cover removed.

DETAILED DESCRIPTION OF THE INVENTION:

FIG. 1 illustrates a front view of a slim type compact strip chart recorder (with the cover removed) that has overall front dimensions on the order of 3 inches by 7½inches. The compact type recorders have the advantage that a large number of such type of recorders can be positioned adjacent each other so that the instruments can be quickly scaned by the operator. The strip chart recorders include a moving strip chart 22 and a plurality of servo driven writing elements 24, 26, and 28 (such as pens) for providing a permanent record on the strip chart 22 of the functions being monitored. Attached to each of the writing elements 24, 26 and 28 are the pointers 30, 32, 34, respectively. The pointers 30, 32 and 34 extend over the scale elements 36, 38, and 40, respectively. In the case of ink type recorders, each pin 24, 26 and 28 is supplied with a separate ink capsule or reservoir, 42, 44, and 46, respectively, (as illustrated in FIG. 2) that carry a supply of ink sufficient to last at least 6 months. With this type of arrangement, the entire pen and reservoir can be removed as a unit and replaced with spare units so that a minimum of down time is experienced during the pen cleaning and reservoir refilling operation. As can be seen from FIG. 2, because of the slim shape of the recorder, very little room is available for the removal from and/or the insertion of, pens and ink capsules through the front of the recorder.

In accordance with the invention, means are provided for the ready removal and substitution of writing elements from the front of the instrument. Rather than rigidly mounting the scales 36–40, as in the prior art, the scales (as illustrated in FIG. 3) are pivotally mounted by the pins 54 and 56 at opposite ends thereof for rotation about an axis that extends parallel to the length of the scales and is adjacent one of the longitudinal sides. A separate sector gear, 58 60 and 62 is connected to separate one of the scales 36, 38 and 40, respectively, to control the rotation thereof. Means, in the form of a rack gear mechanism 64 (FIGS. 4–9), is provided for controlling the simultaneous rotation of the three scales 36, 38, and 40. The rack gear mechanism 64 includes a handle 37 that extends out the front of the recorder (as illustrated in FIG. 1). The rack gear mechanism 64 also includes three parallel rack gears 68, 70 and 72 disposed in a planar array for separating engaging the sector gears 58, 60 and 62, respectively. The rack gear mechanism 64 also includes a tab 74 adapted to engage sockets 76 and 78 in the instrument base 80 to perform a detent function.

Figure 6:
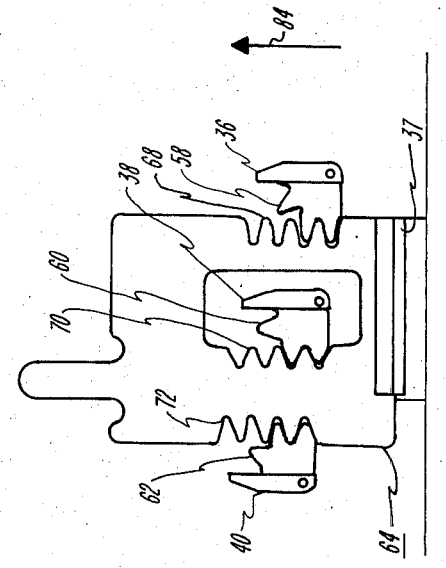
FIG. 6 illustrates the positions of the rack gear mechanisms, the sector gears, and the scale elements in the closed position wherein the scale surfaces face out toward the front of the instrument as illustrated in FIG. 1.
Figure 8:
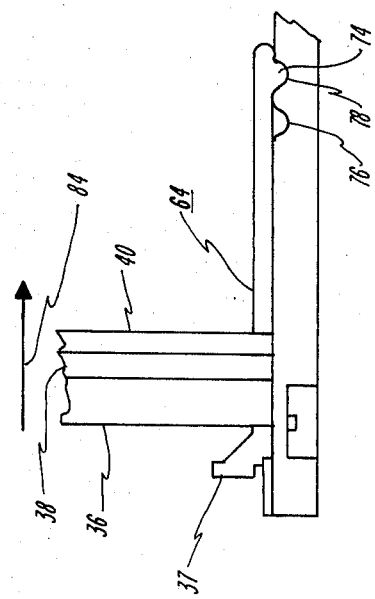
FIG. 8 is a partial side view of FIG. 6 for illustrating the detent mechanism for maintaining the scales in the closed position.
Figure 7:
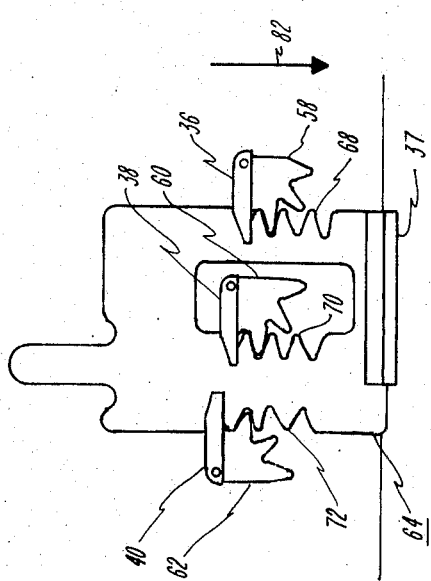
FIG. 7 illustrates the positions of the rack gear mechanism, the sector gears and the scale elements in the open position wherein the scale surfaces face generally normal to the front of the instrument and wherein the spacing between the scales is substantially increased providing an access to the mounting of the writing instruments within the recorder.
Figure 9:
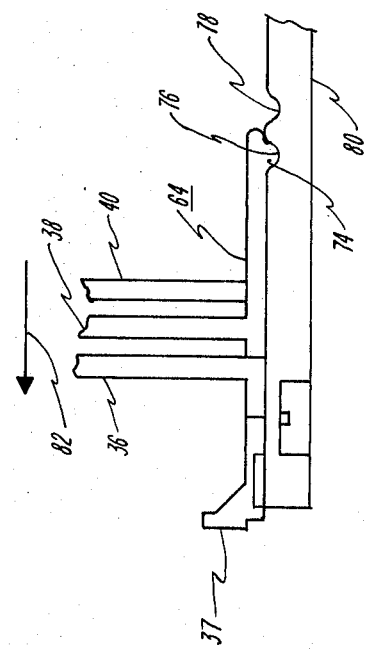
FIG. 9 is a partial side view of FIG. 7 for illustrating the detent mechanism for maintaining the scales in the open position.

FIGS. 6–9 illustrate the rotational movement of the scales. FIGS. 6 and 8 illustrate the position of the scales in the closed or normal position wherein the scale surfaces 36, 38 and 40 face out toward the front of the instrument. FIGS. 7 and 9 illustrate the position of the scales wherein they have been rotated approximately 90° to provide access to the pen mounting. As can be seen, the scales 36, 38 and 40 can be simultaneously rotated from their closed position (as illustrated in FIGS. 6 and 8) to the open position (of FIGS. 7 and 9) by pushing inward on the handle 37 in a direction of the arrow 84 to cause the rack gear mechanism 64 to apply forces to each of the sector gears 58, 60 and 62 to cause each of the scales 36, 38 and 40 to simultaneously rotate until the tab 74 reaches the groove 78 wherein the inward motion is stopped. Guides 71 and 73 are provided to maintain the movement of the gear mechanism 64 in a straight line. With the scales rotated approximately 90° the scales are so displaced so that their smallest dimension (thickness) now faces the front of the recorder. The spacing between the scales 36, 38 and 40 is now substantially increased by a factor determined by the difference between the width of the scales and the thickness of the scales. With the scales so rotated, a sufficient separation is provided between each of the scales so that the writing instruments, i.e., the pens 24, 26 and 28 and their ink reservoirs 42, 44 and 46, can now be removed from the front of the instrument by merely pulling on the pens so that the capsules 42, 44 and 46 slide out of their retainers 48, 50 and 52. The capsules can be refilled, and the pens cleaned and inserted back into their retainers through the front of the instruments in the same manner. With the instruments back in place, the scales 36, 38 and 40 are rotated back to their operating position by merely pulling outward on the handle 37 wherein the movement of the rack gears 64 rotates the scales 36, 38 and 40 to the closed position wherein the tab 74 engages the groove 76.

Although the means for rotating the scales is illustrated as a rack gearing mechanism it is to be understood that a large variety of other types of mechanisms can be provided, such as for example a friction drive. In a friction drive, the sector gears would be replaced by rubber edged discs. The rack gears would be replaced by straight rubber tracks that frictionally engage separate rubber discs. The operation of the friction drive would be essentially the same as that of the rack gearing mechanism except that frictional forces would provide the coupling rather than gear teeth.

Hence, as can be seen, means are provided, in accordance with the invention, for simultaneously rotating the scales 36, 38 and 40 so that their smallest dimension faces the front of the instrument to provide an increased spacing between the scales. This added spacing allows for the removal of and/or insertion of pens and their ink reservoirs via the front of the instrument rather than from the side. There is no need for rotating the pens and their pointers to maneuver around the spacing between the seals and control linkages as is required in the prior art. By being able to remove the pens from the front of the instrument, a simple in and out movement is all that is necessary. In addition to the foregoing, since the pens and their reservoirs can now be removed from the front of the instrument, there is no need for detachable type of pointers, or to limit their size so that they can be readily maunverable between spacing between scales. With the rotatable scales of the invention, the spacing between the scales is not critical other than for providing sufficient room for the movement of the pen and the width of the scales can be maximized to provide added room for the indica to be included thereon By being able to remove the pens and their reservoirs from the front of the instrument there is no need to remove the recorder from its cover thereby reducing the possiblity of dirt contamination in the equipment. Furthermore, by being able to pull the pen and the ink reservoir from the front of the instrument, the likelihood of causing damage to the instrument by maunvering the ink pens and their reservoirs around the mechanical linkages, is eliminated. With the rotatable scales of the invention, the pens and the reservoirs can be removed by simply simultaneously rotating the scales to their open position. A clear path is now provided from the front of the instrument to the clips 48, 50 and 52. The pens and reservoirs are merely pulled out or when replacing inserted in. Hence, by providing access to the writing instruments from the front of the recorder, there is no limitation placed upon the number of writing instruments that can be used in a recorder due to problems associated with the removal, substitution, of the pens.

What is claimed is:

1. In a strip chart recorder including at least one writing element, a scale mechanism for the writing element comprising:
   a plurality of elongated generally rectangular shaped thin strips, wherein the width of the strips is substantially less than the length, and the thickness of the strips is substantially less than the width, and wherein the length and width of the strips define a surface adapted for receiving scale graduations for indicating the positions said writing element;
   means for pivotally mounting said plurality of strips for rotation along an axis that extends along the length of the strip, and
   means for simultaneously rotating each of said plurality of strips from a position wherein said surfaces face the front of the instrument to a position wherein the surfaces are generally normal to the front of the instrument.

2. A scale mechanism as defined in claim 1 wherein: said plurality of strips are pivotally mounted at opposite longitudinal ends.

3. A scale mechanism as defined in claim 2 wherein: separate drive means is provided for each of said scales coupled to control the simultaneous rotation of each of said scales.

4. A scale mechanism as defined in claim 3 wherein: said separate drive means includes
   a separate gear is secured to each of said strips at one end thereof, and
   gear means meshing with each of the gears for controlling the simultaneous rotation thereof.

5. A scale mechanism as defined in claim 4 wherein said gear means includes:
   a plurality of rack type gears, a separate one for each of said gears secured to said strips said rack gears being secured together for simultaneous movement.

6. A scale mechanism as defined in claim 5, wherein said rack type gears include:
   guide means coupled to said rack type gears for guiding the linear movement of said rack type gears into and out of said recorder.

7. A scale mechanism as defined in claim 6 including: detent mean for said sack type gears for limiting the movement thereof in a direction out of said recorder to a point wherein said scale surfaces face said window, and for limiting the movement of said rack gears in a direction into said recorder to a point wherein said scale surfaces are normal to said window.

8. A scale mechanism as defined in claim 7 wherein: said separate gears secured to said strips are sector gears.

9. A scale mechanism as defined in claim 8 wherein: said plurality of strips are pivotally mounted at opposite longitudinal ends and adjacent to the same longitudinal side.

10. A scale mechanism as defined in claim 9 wherein: said writing element includes a pointer that extends across at least one strip for indicating the position of said writing element relative to the strip.

11. In a strip chart recorder including a plurality of pens for writing on a strip chart, each of said pens extending out via the front of the instrument from an ink capsule that is slidably received and captured by lever mechanims and wherein each of said pens includes a bend therein for extending towards and engaging the strip chart, a rotatable scale mechanism for said strip chart comprising:
   a plurality of elongated generally rectangular shaped thin strips, wherein the width of the strips is substantially less than the length, and the thickness of the strips is substantially less than the width, the surface defined by the length and width of said strips is adapted to receive scale graduations;
   means for pivotally mounting said plurality of strips for rotation along an axis that extend along the length of the strips and so that when said surfaces of said strip faces out from the front of the instrument the spacing between the strips is sufficient to allow the free movement of the pens but not the removal of the pens and ink capsules; and
   means for simultaneously rotating each of said plurality of strips from a position wherein said surfaces face out from of the instrument to a position wherein the surfaces are generally normal thereto wherein the spacings between said strips are substantially increased to allow the removal of the pens and ink capsules from the front of the instrument.

12. A rotatable scale mechanism as defined in claim 11 wherein:
   said means for simultaneously rotating said strips include a drive mechanism for rotating each of said strips, said drive mechanism is coupled to a handle extending out from the front of the instrument, and wherein the linear movement of the in and out of the instrument in response to force applied to the handle provide the rotational movement for said strips.

13. A rotatable scale mechanism as defined in claim 12 wherein:
   said means for rotating said strips includes a detent mechanism for limiting the linear movement of said rack gear mechanism and therefor rotational movement of said strips.

14. A rotatable scale mechanism as defined in claim 13 wherein said drive mechanism includes:
  a separate gear secured to each of said strips at one end thereof, and
  a plurality of rack gears, a separate one for each of said gears, said rack gears being secured to said handle for simultaneous movement.

* * * * *